(12) United States Patent
Yilbas et al.

(10) Patent No.: US 8,147,926 B2
(45) Date of Patent: *Apr. 3, 2012

(54) LASER GAS ASSISTED NITRIDING OF ALUMINA SURFACES

(75) Inventors: Bekir S. Yilbas, Dhahran (SA); A. F. M. Arif, Dhahran (SA); Cihan Karatas, Sokok (TR); Abdul Aleem B. Jabbar, Dhahran (SA)

(73) Assignee: King Fahd University of Petroleum & Minerals, Dhahran (SA)

( * ) Notice: Subject to any disclaimer, the term of this patent is extended or adjusted under 35 U.S.C. 154(b) by 332 days.

This patent is subject to a terminal disclaimer.

(21) Appl. No.: 12/453,654

(22) Filed: May 18, 2009

(65) Prior Publication Data

US 2010/0291318 A1     Nov. 18, 2010

(51) Int. Cl.
| | |
|---|---|
| B05D 3/00 | (2006.01) |
| B05D 3/04 | (2006.01) |
| B05D 3/10 | (2006.01) |
| B05D 3/02 | (2006.01) |
| C08J 7/18 | (2006.01) |
| G21H 5/00 | (2006.01) |
| B01D 5/00 | (2006.01) |
| B01J 19/12 | (2006.01) |

(52) U.S. Cl. ... 427/554; 427/340; 427/228; 304/157.22; 304/157.41

(58) Field of Classification Search .......... 427/554, 427/530, 553, 228, 340; 204/157.22; 118/600
See application file for complete search history.

(56) References Cited

U.S. PATENT DOCUMENTS

| | | | | |
|---|---|---|---|---|
| 4,451,302 | A | * | 5/1984 | Prescott et al. ............... 148/224 |
| 4,810,438 | A | * | 3/1989 | Webster et al. ............. 264/40.6 |
| 4,857,246 | A | | 8/1989 | Bolt |
| 4,917,877 | A | | 4/1990 | Oguni et al. |
| 4,992,253 | A | | 2/1991 | Wu et al. |
| 5,145,741 | A | | 9/1992 | Quick |
| 5,246,741 | A | * | 9/1993 | Ouhata et al. ................. 427/524 |

(Continued)

FOREIGN PATENT DOCUMENTS

FR      2865671      8/2005

OTHER PUBLICATIONS

Yongqing Fu et al, Laser Nitriding of Pure Titanium with Ni, Cr for improved wear performance, Wear,1998, vol. 214, p. 83-90).*

*Primary Examiner* — Dah-Wei Yuan
*Assistant Examiner* — Nga Leung V Law
(74) *Attorney, Agent, or Firm* — Richard C. Litman

(57) ABSTRACT

Laser gas assisted nitriding of alumina surfaces is a process for applying a nitride coating to an alumina or alumina-based composite surface. The method involves the step of applying a phenolic resin to the alumina surface in a thin, uniform film. The resin-coated alumina surface is maintained in a controlled chamber at about 8 bar pressure at a temperature of about 175° C. for about 2 hours. The surface is then heated at about 400° C. for several hours in an argon atmosphere. This converts the phenolic resin to carbon. The carbon coated alumina surface is then scanned by a 2 kW laser beam while applying nitrogen under pressure. The end result is the conversion of the alumina at the surface to aluminum nitride, the oxygen being released in the form of carbon dioxide.

7 Claims, 2 Drawing Sheets

U.S. PATENT DOCUMENTS

| | | |
|---|---|---|
| 5,451,444 A * | 9/1995 | DeLiso et al. ............... 428/116 |
| 5,688,320 A | 11/1997 | Gribkov et al. |
| 6,744,076 B2 | 6/2004 | Fukuyama et al. |
| 7,216,661 B2 | 5/2007 | Welty et al. |
| 7,220,314 B2 | 5/2007 | Fukuyama et al. |
| 7,338,555 B2 | 3/2008 | Fukuyama et al. |
| 2004/0185666 A1 | 9/2004 | Fukuyama et al. |
| 2004/0222211 A1 | 11/2004 | Hiramatsu et al. |
| 2008/0118649 A1 * | 5/2008 | Rathenow et al. ......... 427/385.5 |

* cited by examiner

LASER GAS ASSISTED NITRIDING OF ALUMINA SURFACES

BACKGROUND OF THE INVENTION

1. Field of the Invention

The present invention relates to processes for coating metals, and particularly to laser gas assisted nitriding of alumina surfaces.

2. Description of the Related Art

Nitriding is the process of adding nitrogen to the surface of metals for improved hardness and wear resistance. A nitride coating may be applied to many different metals, including steel and other ferrous metals, titanium, molybdenum, and aluminum. Several processes are known for applying the nitride coating, such as gas nitriding, liquid or salt bath nitriding, and ion or plasma nitriding. Conventional gas nitriding generally uses ammonia, which dissociates to form nitrogen and hydrogen when brought into contact with a heated metal workpiece. Other processes are generally performed at high temperatures and/or pressures, and require substantial periods of time to form the nitride surface to the desired depth.

Laser gas assisted nitriding is a relatively new process for applying a nitride coating to metals. The process generally involves exposing the workpiece to laser radiation for comparatively brief periods in the presence of an inert gas. Nitrogen is supplied under pressure. Laser nitriding has several advantages, including the ability to apply a very thin coating; the ability to apply the coating in a vary narrow beam, if desired; relatively low temperatures and pressures to avoid deformation of the metal; and quick processing times, with exposure to radiation often being less than a second.

Alumina ($Al_2O_3$) finds wide application in industry due to its tribological and thermal properties, such as corrosion resistance and thermal stability at high temperatures. Alumina is widely used in lined process piping, chutes, cyclones, lined metal fabrication, and grinding mill components. This is due to the fact that all of these applications require a unique combination of hardness, extremely high abrasion resistance, and high strength over a broad range of temperatures. Moreover, alumina tiles are formed from fine alumina powders through sintering. The tiles have high porosity, particularly in the surface region. Alumina tiles are, in general, produced from microsized alumina powders. Depending on the powder size, in some cases, structural non-homogeneity and abnormalities, such as scattered small voids, are formed in the tiles. These abnormalities in the structure, particularly in the surface region, can be minimized through controlled laser melting.

However, during the laser melting process, an assisting gas is used to prevent excessive oxidation reactions taking place in the irradiated region. The oxidation reactions are exothermic, increasing the surface roughness and crack formation through subsequent high heating and cooling rates in the irradiated region. The use of the inert gas, such as nitrogen, in the laser melting process prevents surface defects that would otherwise result from high temperature oxidation reactions. Moreover, nitrogen at high temperatures and pressures forms AlN in the surface region, thus modifying the surface hardness. Because alumina and alumina-based composites have oxygen incorporated therein, it would be desirable to have a process that produces a hard, wear resistant nitride surface that is also not prone to developing cracks.

Thus, laser gas assisted nitriding of alumina surfaces solving the aforementioned problems is desired.

SUMMARY OF THE INVENTION

Laser gas assisted nitriding of alumina surfaces is a process for applying a nitride coating to an alumina or alumina-based composite surface. The method involves the step of applying a phenolic resin to the alumina surface in a thin, uniform film. The resin-coated alumina surface is maintained in a controlled chamber at about 8 bar pressure at a temperature of about 175° C. for about 2 hours. The surface is then heated at about 400° C. for several hours in an argon atmosphere. This converts the phenolic resin to carbon. The carbon coated alumina surface is then scanned by a 2 kW laser beam while applying nitrogen under pressure. The end result is the conversion of the alumina at the surface to aluminum nitride, the oxygen being released in the form of carbon dioxide.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
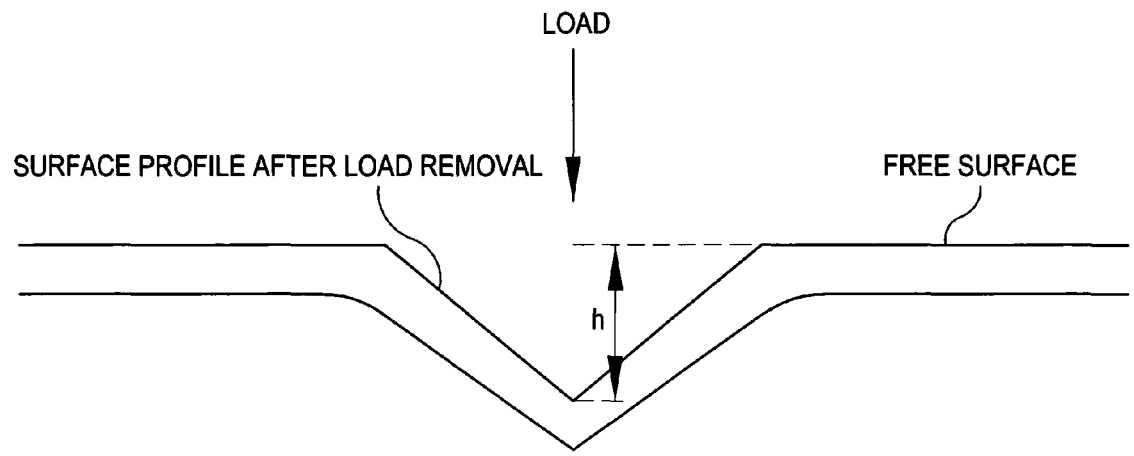
FIG. 1 is a schematic diagram showing parameters for indentation testing to determine Young's modulus and fracture toughness of surfaces treated with the method of laser gas assisted nitriding of alumina surfaces according to the present invention.

Laser gas assisted nitriding of alumina surfaces is a process for applying a nitride coating to an alumina or alumina-based composite surface. The method involves the step of applying a resin containing an organic compound, preferably a phenolic resin, to the alumina surface in a thin, uniform film. The resin-coated alumina surface is maintained in a controlled chamber at about 8 bar pressure at a temperature of about 175° C. for about 2 hours. The surface is then heated at about 400° C. for several hours in an argon atmosphere. This converts the phenolic resin to carbon. The carbon coated alumina surface is then scanned by a 2 kW laser beam while applying nitrogen under pressure. The end result is the conversion of the alumina at the surface to aluminum nitride, the oxygen being released in the form of carbon dioxide.

The method is best illustrated by reference to the following example.

EXAMPLE

A $CO_2$ laser (LC-ALPHAIII) delivering nominal output power of 2 kW was used to irradiate the workpiece surface. The nominal focal length of the focusing lens was 127 mm. The laser beam diameter focused at the workpiece surface was ~1 mm. Nitrogen assisting gas emerging from the conical nozzle coaxially with the laser beam was used. Laser treatment conditions are given in Table I.

TABLE I

Laser Nitriding Conditions

| | |
|---|---|
| Scanning speed (cm s$^{-1}$) | 50 |
| Power (W) | 2000 |
| Frequency (Hz) | 100 |
| Nozzle gap (mm) | 1.5 |
| Nozzle diam. (mm) | 1.5 |
| Focus setting (mm) | 127 |
| N$_2$ pressure (kPa) | 600 |

Alumina (Al$_2$O$_3$) tiles with 5 mm thickness were used as workpieces. The phenolic resin was applied to the surface of Al$_2$O$_3$ tile. A uniform phenolic resin thickness of 50 μm was achieved at the tile surface in a control chamber at 8 bar pressure and 175° C. for 2 hours. The workpieces were then heated to 400° C. in an argon environment for several hours to ensure the conversion of the phenolic resin into carbon. The carbon coated Al$_2$O$_3$ tiles were scanned by a laser beam according to the parameters given in Table 1. The development of the carbon layer on the tile surface was necessary to form AlN compound in the surface region. During the laser treatment process, two steps are involved. In the first step, the addition of a fine carbon layer at the tile surface provided the following reaction during the laser heating:

$$Al_2O_3 + 2C \rightarrow Al_2O + 2CO.$$

In the second step, introducing nitrogen as an assisting gas provides the following reaction during the laser heating:

$$Al_2O + CO + N_2 \rightarrow 2AlN + CO_2.$$

Material characterization of the laser nitrided surfaces was carried out using SEM, EDS, and XRD. Jeol 6460 electron microscopy was used for SEM examinations, and Broker D8 Advanced having Mo K$_\alpha$ radiation was used for XRD analysis. A typical setting of XRD was 40 kV and 30 mA, and scanning angle 2θ was ranged between 20° and 80°.

Microphotonics digital microhardness tester (MP-100TC) was used to obtain microhardness across the depth of the nitride layer. The standard test method for Vickers indentation hardness of advanced ceramics (ASTM C1327-99) was adopted. Microhardness was measured at the workpiece surface after the laser treatment process. The workpiece cross section was also prepared for the microhardness measurements. The measurements were repeated three times at each location for the consistency of the results.

Figure 2:
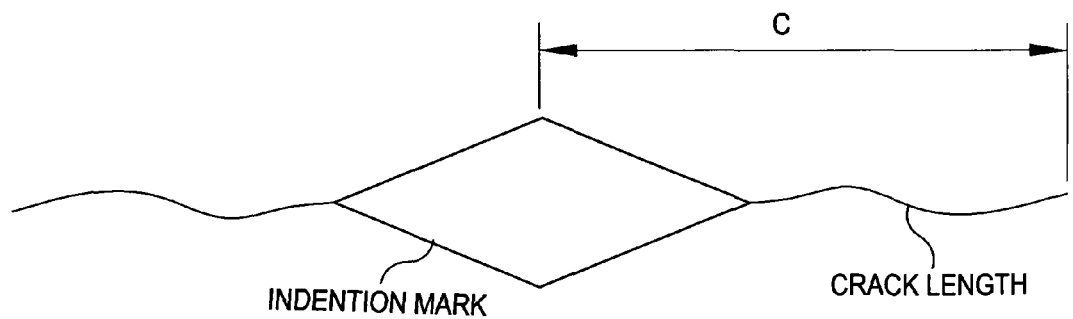
FIG. 2 is a schematic diagram showing the geometric configuration of the indentation mark and crack length in relation to fracture toughness for indentation testing of surfaces treated with the method of laser gas assisted nitriding of alumina surfaces according to the present invention.

The elastic response of the surface when subjected to indention testing needs to be examined, through which Young's modulus can be determined. After considering FIGS. 1 and 2, Young's modulus can be formulated as:

$$E^* = \left(\frac{9}{16}\right)^{0.5} P h^{-1.5} R^{-0.5} \qquad (1)$$

where P is the applied load, h is the elastic penetration of the indenter and R is the indenter radius. The true modulus of elasticity can be determined using the indenter properties, i.e., $$E = \frac{1 - v^2}{1/E^* - (1 - v_i^2)/E_i} \qquad (2)$$

where $E_i$ and $v_i$ are the Young's modulus and Poisson's ratio of indenter, respectively. In the calculations, $E_i$=1141 GPa and $v_i$=0.07 (diamond indenter), and v=0.24$^{17}$ are taken.

The fracture toughness of the surface is measured using the indenter test data for microhardness (Vickers) and crack inhibiting. In this case, microhardness in HV and the crack length generated due to indentation at the surface are measured. The lengths of the cracks, which are generated due to indentation at the surface, are measured. The length/measured corresponded to the distance from the crack tip to the indent. The crack lengths were individually summed to obtain Σl. The crack length c from the centre of the indent is the sum of individual crack lengths Σl and half the indent diagonal length 2a. Therefore, c=a+Σl. However, depending upon the ratio of c/a, various equations were developed to estimate the fracture toughness K. However, the equation proposed by the prior art has limitations due to non-linearity of the coefficients for values of c/a>2, which is not case for the alumina (≈0.8-1.5). Therefore, the following equation is used to determine the fracture toughness K, which is applicable for (0.6≦c/a≦4.5), i.e., $$K_c = 0.079 \left(\frac{P}{a}\right)^{3/2} \log\left(4.5 P \frac{a}{c}\right). \qquad (3)$$

where P is the applied load on indenter, c is the crack length and a is the half indent diagonal length. The results of the calculations are given in Table II. The estimated error based on repeats of the indentation tests is 7%. Moreover, in order to visualize the cracks formed around the indention mark, the top surface of the coating was ground slightly.

TABLE II

Indentation Test Results

| | Untreated workpiece | Laser treated workpiece |
|---|---|---|
| Fracture toughness (MPa m$^{1/2}$) | 3.5 | 2.7 |
| E (Gpa) | 280 | 310 |
| H | 1100 HV | 1150 HV |
| | 10.8 Gpa | 11.3 CPa |
| P (N) | 20 | 20 |
| I (×10$^{-6}$ m) | 320 | 380 |

In the two layer system, the thermally induced normal surface stress can be determined from the following equation:

$$\sigma_c = \frac{E_c(\alpha_c - \alpha_s)\Delta T/(1 - v_c)}{2(h_c/h_s)(E_c/E_s)[(1 - v_s)/(1 - v_c)]} \qquad (4)$$

where E, α, and v are Young's modulus, the linear thermal expansion coefficient, and Poisson's ratio, and h is thickness, while c represents the laser treated layer and s represents the as received material. After assuming that the workpiece thickness is much larger than the thickness of the laser treated region, equation (4) reduces to $$\sigma_c = \frac{E_c(\alpha_c - \alpha_s)\Delta T}{1 - v_c} \qquad (5)$$

Equation (5), the data in Table II and ΔT=1000° C. are used to determine the thermally induced normal surface stress, which is −1.56 GPa (compressive).

Optical micrographs of the laser irradiated surface and SEM images of the top surface of the laser treated and untreated workpieces were examined. It is evident from the SEM images that the untreated alumina surfaces have some small scattered porosity. This is related to the manufacturing of the alumina tiles, in which the alumina powders are used. However, laser remelting provided smooth surfaces without defects. In the case of high duty cycles of laser output, in which the laser power intensity is high, scattered fine surface cracks are developed. Some of these cracks join to form larger and deep cracks while modifying the surface texture. The formation of cracks is associated with the high temperature gradient in the surface vicinity of the workpiece. This, in turn, results in excessive thermally induced residual stresses in this region. Moreover, scattered and arbitrarily distributed cracks indicate that the cooling rate is non-uniform across the surface, and results in non-uniform distribution of the temperature gradient in this region.

It should be noted that due to the presence of pores in the surface region, thermal conductivity reduces and temperature gradient increases significantly. SEM images show that the surface is completely melted, and pore holes are not visible at the surface. However, the shortage of crack formation at low laser power intensity is because of the low temperature gradient, resulting in low thermal stress levels. In addition, some submicron size pores and heterogeneity in the laser treated zone limit the propagation of the microfracture. In this case, variation in thermal expansion coefficients for different species in the irradiated zone results in branching of microfractures at grain boundaries of different species.

SEM images of a cross section of the laser treated alumina were examined. It was observed that the laser treated section extends ~40 μm below the surface. A close view of the laser treated region revealed that two regions can be distinguished. The first region is close to the surface, while the second region lies below the first region. The first region is dense and free from pores and cracks, which is true for treatment at low laser power intensity, while microcracks are observed at high laser power intensity setting. This is because of the development of the high temperature gradient and resulting high thermal stress levels. The dense layer is AlN and $\alpha$-$Al_2O_3$, and the second layer is $\gamma$-$Al_2O_3$. It should be noted that transformation of $\gamma$-$Al_2O_3$ to $\alpha$-$Al_2O_3$ occurs at around 1100° C., which is lower than the melting temperature of alumina (~2050° C.).

Moreover, the grains in the region close to the surface are considerably smaller than the alumina grains in the treated region. This is because of the formation of AlN in this region or a high cooling rate due to heat convection at the surface, which results in smaller grains in the surface region, or both. Moreover, the transformation of $Al_2O_3$ into AlN generates slight volume shrinkage, since the density of AlN is lower than $Al_2O_3$. The volume shrinkage results in excessive compactness in the coatings and randomly distributed submicropores in the surface region, so that only a few pores are observed in this region. However, in the second layer, randomly stacked lamellae structure is observed. In addition, a heat-affected zone is not observed clearly between the second region and the alumina base. This is attributed to heat release during the solidification, which transfers heat to the solid phase at the melt/solid interface. This, in turn, results in a solid phase transformation in the region next to the melt/solid interface. Since the thermal diffusivity of alumina is low, the depth of the heat affected zone becomes considerably shallow.

Figure 3:
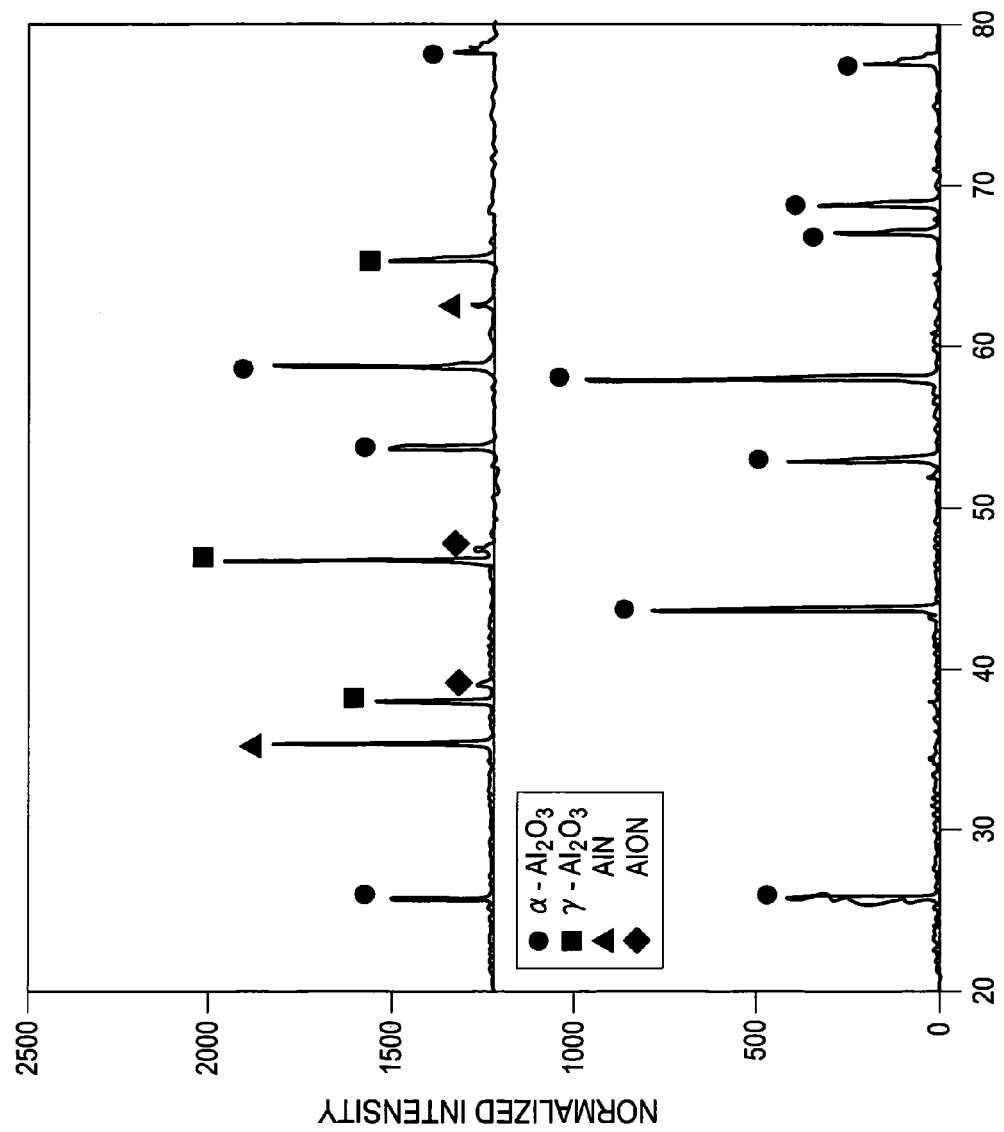
FIG. 3 is an x-ray diffractogram comparison of untreated alumina surfaces with alumina surfaces treated by the method of laser gas assisted nitriding of alumina surfaces according to the present invention.

As shown in FIG. 3, XRD diffractograms for the laser treated and untreated workpieces were made. The diffractogram for the untreated workpiece shows that the $\gamma$-$Al_2O_3$ phase is present predominantly, with the existence of the $\alpha$-$Al_2O_3$ phase. It should be noted that during the preparation of alumina tiles from the powders, rapid cooling rates cause the formation of metastable $\gamma$-$Al_2O_3$. However, laser treatment causes transformation of the $\gamma$-$Al_2O_3$ in to a stable $\alpha$-$Al_2O_3$. The formation of the thermodynamically stable $\alpha$-$Al_2O_3$ phase can be attributed to thermal relaxation of a non-equilibrium $\gamma$-$Al_2O_3$ phase, which has a defect spiral structure. Moreover, the formation of AlN is evident with the lattice parameter a=0.3112 nm and c=0.4979 nm.

The nitriding reactions cause AlN to grow gradually in the irradiated zone. Consequently, the depth of the nitrided zone becomes shallow, which is limited with the first region in the nitrided surface. The diffractogram peak for an AlON species is also observed. This can be related to a lone oxygen released from the alumina during the laser treatment process. In this case, when the temperature reaches above the melting temperature, AlO is formed through the reaction:

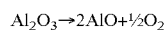

The lone oxygen atom remains in the alumina structure. However, under the nitrogen ambient, the following reaction takes place:

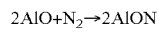

The formation of AlON species increases the hardness and ductility of the surface.

Table II shows fracture toughness measurement results. The fracture toughness of laser nitrided surfaces is less than that corresponding to the received, untreated surface. The percentage difference in the fracture toughness between the laser treated and as received surfaces is ~22%. Moreover, the microhardness for the laser nitrided surfaces attains slightly higher value than that of the untreated surface. This is associated with the AlN compounds formed in the surface region during the laser treatment process, in which case a compact structure is formed in this region. Moreover, the normal stress determined from equation (2) is in the order of about −1.56 GPa. Since the stress value is negative, a compressive stress field is generated in the first region where AlN compound is formed. It should be noted that fracture failure takes place at the surface in tension, but can also occur due to surface compressive stresses. Consequently, failure under compression occurs when the crack tip exceeds the sum of theoretical strength and compressive stress.

It is to be understood that the present invention is not limited to the embodiments described above, but encompasses any and all embodiments within the scope of the following claims.

We claim:

1. A method for laser gas assisted nitriding of an alumina surface, comprising the steps of:
   applying an organic resin to the alumina surface in a thin, uniform film;
   maintaining the resin-coated alumina surface in a controlled chamber at about 8 bar pressure at a temperature of about 175° C. for about 2 hours;
   thereafter, heating the resin-coated alumina surface at about 400° C. in an inert gas atmosphere to convert the organic resin to carbon; and
   scanning the carbon coated alumina surface with a laser beam while applying nitrogen under pressure to form an aluminum nitride coating.

2. The method for laser gas assisted nitriding of an alumina surface according to claim 1, wherein the heating step is maintained for several hours.

3. The method for laser gas assisted nitriding of an alumina surface according to claim 1, wherein the laser beam is generated at 2 kW of power.

4. The method for laser gas assisted nitriding of an alumina surface according to claim 1, wherein the laser beam is generated by a $CO_2$ laser.

5. The method for laser gas assisted nitriding of an alumina surface according to claim 1, wherein the nitrogen is applied at a pressure of about 600 kPa.

6. The method for laser gas assisted nitriding of an alumina surface according to claim 1, wherein the organic resin comprises a phenolic resin.

7. The method for laser gas assisted nitriding of an alumina surface according to claim 6, wherein the step of applying comprises applying the phenolic resin to the alumina surface in a film having a thickness of about 50 μm prior to the heating thereof.

* * * * *